(12) United States Patent
Sepulveda et al.

(10) Patent No.: US 8,865,055 B2
(45) Date of Patent: Oct. 21, 2014

(54) PRODUCTION OF SINTERED THREE-DIMENSIONAL CERAMIC BODIES

(75) Inventors: Juan L. Sepulveda, Tucson, AZ (US); Raouf O. Loutfy, Tucson, AZ (US); Sekyung Chang, Tucson, AZ (US); Ricardo Ramos, Ewing, NJ (US); Sharly Ibrahim, Tucson, AZ (US)

(73) Assignee: Materials and Electrochemical Research (MER) Corporation, Tucson, AZ (US)

( * ) Notice: Subject to any disclaimer, the term of this patent is extended or adjusted under 35 U.S.C. 154(b) by 86 days.

(21) Appl. No.: 13/385,414

(22) Filed: Feb. 17, 2012

(65) Prior Publication Data

US 2013/0106009 A1    May 2, 2013

Related U.S. Application Data

(63) Continuation-in-part of application No. 12/460,450, filed on Jul. 16, 2009, now abandoned.

(60) Provisional application No. 61/135,035, filed on Jul. 16, 2008.

(51) Int. Cl.
| | |
|---|---|
| *C04B 35/443* | (2006.01) |
| *C04B 35/645* | (2006.01) |
| *B29B 13/04* | (2006.01) |
| *C04B 35/626* | (2006.01) |
| *C04B 35/632* | (2006.01) |
| *B28B 3/02* | (2006.01) |
| *B28B 1/00* | (2006.01) |

(52) U.S. Cl.
CPC ........... *B29B 13/045* (2013.01); *C04B 2235/94* (2013.01); *C04B 35/62655* (2013.01); *C04B 2235/656* (2013.01); *C04B 2235/6567* (2013.01); *C04B 2235/6026* (2013.01); *C04B 35/632* (2013.01); *C04B 2235/6581* (2013.01); *C04B 35/443* (2013.01); *C04B 2235/661* (2013.01); *C04B 2235/608* (2013.01); *C04B 35/645* (2013.01); *C04B 2235/604* (2013.01); *B28B 3/025* (2013.01); *C04B 2235/445* (2013.01); *C04B 2235/96* (2013.01); *C04B 35/6455* (2013.01); *C04B 2235/3203* (2013.01); *B28B 1/007* (2013.01)
USPC ........................................... 264/663; 264/667

(58) Field of Classification Search
CPC .................. B28B 1/007; C04B 35/443; C04B 2235/3222; C04B 2111/805
See application file for complete search history.

(56) References Cited

U.S. PATENT DOCUMENTS

| | | |
|---|---|---|
| 3,330,892 A | 7/1967 | Herrmann |
| 3,516,935 A | 6/1970 | Monforte et al. |

(Continued)

OTHER PUBLICATIONS

Araki et al., "New Freeze-Casting Technique for Ceramics with Sublimable Vehicles", J.Am.Ceram.Soc., 87 (10) 1859-1863 (2004).

(Continued)

*Primary Examiner* — Joseph S Del Sole
*Assistant Examiner* — Russell Kemmerle, III

(57) ABSTRACT

A freeze-forging method for producing sintered three-dimensional ceramic bodies, particularly magnesium aluminate spinel domes. The method comprises forming a ceramic mix of a ready-to-sinter ceramic powder and a nonaqueous liquefied sublimable vehicle having a solidification temperature from room temperature to below 200° C.; reducing the temperature of the ceramic mix to below the vehicle's solidification temperature to freeze the mix; crushing the frozen mix into powdered form; molding the frozen powder into net shape by cold forging in a mold to form a net-shaped green body preform of the desired three-dimensional shape; and densifying the green body into a sintered three-dimensional ceramic body.

25 Claims, 2 Drawing Sheets

(56) References Cited

U.S. PATENT DOCUMENTS

| | | | |
|---|---|---|---|
| 3,828,382 | A | 8/1974 | Nakamura |
| 4,314,042 | A | 2/1982 | Goto et al. |
| 4,347,210 | A | 8/1982 | Maguire et al. |
| 4,428,895 | A | 1/1984 | Blasch et al. |
| 4,563,432 | A | 1/1986 | Ehlert et al. |
| 4,930,731 | A | 6/1990 | Roy et al. |
| 5,047,182 | A | 9/1991 | Sundback et al. |
| 5,178,744 | A | 1/1993 | Nakazawa et al. |
| 5,415,834 | A | 5/1995 | Finkl et al. |
| 5,431,967 | A | 7/1995 | Manthiram et al. |
| 5,696,041 | A | 12/1997 | Collins et al. |
| 5,928,583 | A | 7/1999 | McClellan et al. |
| 6,248,685 | B1 | 6/2001 | Joubert et al. |
| 6,796,366 | B2 | 9/2004 | Roche et al. |
| 7,211,325 | B2 | 5/2007 | Villalobos et al. |
| 7,528,086 | B2 | 5/2009 | Villalobos et al. |
| 2004/0266605 | A1 | 12/2004 | Villalobos et al. |
| 2006/0192038 | A1 | 8/2006 | Sekine |
| 2006/0211567 | A1 | 9/2006 | Kuhn et al. |
| 2007/0087204 | A1 | 4/2007 | Bayya et al. |
| 2007/0238835 | A1 | 10/2007 | Chen |
| 2008/0138622 | A1 | 6/2008 | Guiselin et al. |
| 2008/0171811 | A1 | 7/2008 | Guiselin et al. |
| 2008/0292883 | A1 | 11/2008 | Bach et al. |
| 2011/0042626 | A1 | 2/2011 | Enomura |

OTHER PUBLICATIONS

Araki et al., "Room-Temperature Freeze Casting for Ceramics with Nonaqueous Sublimable Vehicles in the Naphthalene-Camphor Eutectic System", J.Am.Ceram.Soc.87(11)2014-19(2004).

Araki et al.,"Porous Ceramic Bodies with Interconnected Pore Channels by a Novel Freeze Casting Technique", J.Am.Ceram. Soc.,88(5)1108-1114(2005).

PRODUCTION OF SINTERED THREE-DIMENSIONAL CERAMIC BODIES

This application is a continuation-in-part of U.S. application Ser. No. 12/460,450, filed Jul. 16, 2009, now abandoned, which claims the benefit of U.S. Provisional Application No. 61/135,035, filed Jul. 16, 2008, the entire contents of both of which are incorporated herein by reference.

This invention was made with Government support under Government Contract No. W31P4Q-07-C-0080, awarded by the U.S. Army. The Government has certain rights in the invention.

FIELD OF THE INVENTION

The present invention relates to the production of sintered three-dimensional ceramic bodies, and more particularly, to the production of transparent sintered magnesium aluminate spinel domes and the like.

BACKGROUND OF THE INVENTION

Magnesium aluminate spinel, $MgAl_2O_4$, (hereinafter "spinel") is a very attractive ceramic material for use in various applications requiring a rugged, tough, scratch resistant, transparent material. Spinel articles have a wide transparency range from visible to 5.5 μm wavelength, and mechanical properties several times greater than that of glass while being remarkably lighter than ballistic glass by a factor of 2 for the same degree of armor ballistic protection.

Some of the applications for which spinel is particularly suited require three-dimensional bodies of complex geometry, such as domes for missiles and the like. Since spinel's hardness makes it very difficult to machine, successfully producing such three-dimensional spinel bodies in a cost-effective manner has proven to be no easy task. Illustrative of prior art attempts to do so are the Maguire et al. U.S. Pat. No. 4,347,210, issued Aug. 31, 1982, and the Roy et al. U.S. Pat. No. 4,930,731, issued Jun. 5, 1990.

Maguire et al. employ a hot forging technique in which a combination of tensile and compressive stresses are used to plastically deform a sintered spinet plate between the two portions of a mold defining a cavity of the desired complex shape to produce a spinel body in the shape of the mold cavity. By its very nature, the Maguire et al. technique requires a lot of material rearrangement resulting in nonuniformity in dome dimensions, especially wall thickness, and also introduces undesirable stresses into the spinel body.

The more conventional approach described by Roy et al. uses spinel powder mixed with small amount of a sintering aid, such as lithium fluoride (LiF), which is formed directly into a dome-shaped sintered spinel body in a die mold first using low pressure cold pressing to effect slight compacting of the powder for ease of handling, followed by densification via hot pressing or pressureless sintering, followed by further densification via hot isostatic pressing. Since Roy et al. do not specify any unique mode of mixing the spinel powder with the LiF sintering aid, it can be assumed that they contemplated nothing more than traditional mechanical dry mixing, such as mortar and pestle, ball milling or attritor milling. However, as has been well documented by Villalobos et al. in U.S. Patent Application Publication No. 2004/0266605, published Dec. 30, 2004, U.S. Pat. No. 7,211,325, issued May 1, 2007, and U.S. Pat. No. 7,528,086, issued May 5, 2009, inhomogeneity and contamination problems associated with mechanical mixing of the sintering aid with the spinel powder prior to sintering have been found to be the leading cause of high product rejection rates in attempting to produce defect-free transparent sintered spinel articles.

A known technique for producing complexly shaped, three-dimensional bodies of sintered ceramic materials other than spinel, is freeze casting. Representative U.S. patents describing this technique are the Herrmann U.S. Pat. No. 3,330,892, issued Jul. 11, 1967 and the Sundback et al. U.S. Pat. No. 5,047,182, issued Sep. 10, 1991. In freeze casting, a ceramic powder is mixed with a sublimable vehicle to form a slurry which is cast and then frozen in a mold of the desired complex shape. The frozen part or compact is then demolded and the vehicle is removed by sublimation, i.e., freeze-drying, to obtain a green body which is thereafter sintered to the final densified product. More recently, both camphene and eutectic mixtures of camphor and naphthalene were described as suitable for use as nonaqueous sublimable vehicles in the freeze casting of alumina articles at or near room temperature, by Araki et al. in J. Am. Ceram. Soc. 87 (10) 1859-1863 (2004) and J. Am. Ceram. Soc. 87 (11) 2014-2019 (2004).

What appears to be lacking from the prior art is any reference to the successful application of the freeze casting technique or any modification thereof to the production of transparent sintered three-dimensional spinel bodies. One of the reasons for this might very well be the need to first develop a more effective ready-to-sinter spinel powder that overcomes the inhomogeneity and contamination problems associated with the mechanical mixing of the sintering aid with the spinel powder prior to sintering. Such a powder and its method of preparation are described and claimed in the commonly owned copending U.S. patent application Ser. No. 12/460,451 of Raouf O. Loutfy et al. entitled "Ready-to-Sinter Spinel Nanomixture and Method for Preparing Same," filed Jul. 16, 2009, now U.S. Pat. No. 8,313,725, issued Nov. 20, 2012, and which is incorporated herein by reference in its entirety.

SUMMARY OF THE INVENTION

The present invention is an adaptation based on the conventional freeze casting technique, and which is referred to herein as "freeze-forging." It differs from conventional freeze casting by using a free flowing granulated frozen solid mix which is molded into net shape by cold forging, rather than a liquid vehicle-solids slurry which is molded by casting and then freezing.

The freeze-forging method of the present invention produces a net-shape sintered three-dimensional ceramic body of a desired complex geometry, using as starting materials a ready-to-sinter ceramic powder and a nonaqueous liquefied vehicle comprising a sublimable organic binding agent and having a solidification temperature of from about room temperature to below about 200° C. The ceramic powder is mixed with the liquefied vehicle to form a homogeneous pseudoplastic shear thinning ceramic mix comprising the ceramic powder dispersed in the liquefied vehicle. The temperature of the ceramic mix is then reduced to below the solidification temperature of the vehicle to thereby freeze the ceramic mix. The frozen ceramic mix is then crushed into powdered form, and the powdered frozen ceramic mix, which is free flowing and held together by the frozen vehicle and is completely conformable to any given mold cavity, is molded into a net-shaped green body preform of the desired geometry by cold forging in a mold of the desired geometry. The green body is then densified by hot pressing or pressureless sintering into a sintered ceramic body of the desired geometry and substantially free of the vehicle at early stages of the sintering process, and the sintered ceramic body is thereafter subjected to further densification via hot isostatic pressing to thereby substantially eliminate any residual porosity in the sintered body.

While the freeze-forging method of the present invention has been designed primarily for the production of net-shaped transparent sintered three-dimensional spinel bodies, such as domes and the like, from the ready-to-sinter spinel nanomixture powder described and claimed in the above referenced Loutfy et al. U.S. patent application Ser. No. 12/460,451, and to be described more fully hereinafter, the process is equally as applicable to a wide range of other sinterable ceramic materials.

DESCRIPTION OF PREFERRED EMBODIMENTS

Figure 1:
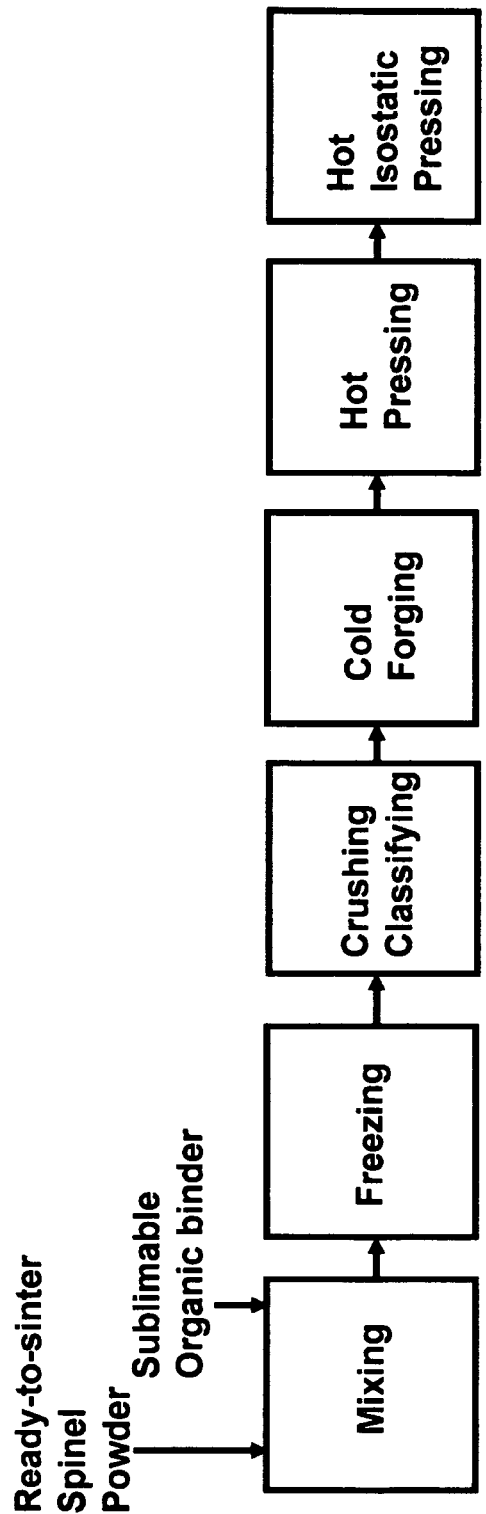
FIG. 1 is a flow sheet diagram illustrating the general steps of the freeze-forging method in accordance with the present invention.

The various ceramic materials, in addition to magnesium aluminate spinel, to which the freeze-forging method of the present invention is applicable, include ceramics such as alumina, zirconia, magnesia, beryllia, silica, cordierita, silimanita, tabular alumina, crystobalita, tridimita, yttria, chromite, lanthanide doped oxide ceramics, yttrium aluminate garnet, vitreous china, porcelain, stoneware, AlON, $Si_3N_4$, MN, SiAlON, SiC and $B_4C$.

The freeze-forging method of the present invention is particularly advantageous for the production of net-shape transparent sintered three-dimensional spinel bodies, in conjunction with the ready-to-sinter spinel nanomixture powder described and claimed in the Loutfy et al. U.S. patent application Ser. No. 12/460,451, referred to above. The nanomixture powder consists of a nanomixture of magnesium aluminate spinel nanoparticles and a uniformly distributed controlled concentration of an inorganic sintering aid. The sintering aid will typically be LiF, in a controlled concentration within the range of from about 0.2 to about 2.0 weight percent, preferably from about 0.3 to about 1.25 weight percent, and optimally from about 0.35 to about 0.75 weight percent.

The nanomixture powder is formed by a process comprising mixing the spinel nanoparticles with an aqueous solution of the LiF sintering aid to form a spinel dispersion, decreasing the solubility limit of the LiF in the spinel dispersion to a point sufficiently low so as to induce precipitation of LiF nanoparticles out of solution and into a mixed dispersion with the spinel nanoparticles, separating from the mixed dispersion an in-situ formed nanomixture of the spinel nanoparticles and the LiF nanoparticles, drying the spinel-LiF mixture, and deagglomerating the dried spinel-LiF nanomixture. The resulting ready-to-sinter spinel powder will be composed of LiF nanoparticles 20-100 nm in size, uniformly distributed among spinel nanoparticles 10-2000 nm in size.

In the preferred embodiment of the freeze-forging method of the present invention, the above-described spinel nanomixture powder will be one of the two starting materials.

The other precursor is a nonaqueous liquefied vehicle comprising a sublimable organic binding agent and having a solidification temperature from about room temperature to below about 200° C., ideally within the range of from about 30° C. to about 60° C. Suitable binding agents include, for example, camphor, naphthalene, camphor-naphthalene mixtures and camphene, with camphor-naphthalene mixtures of from about 55 to about 80 weight percent camphor and from about 45 to about 20 weight percent naphthalene being preferred. The most preferred binder is a close to eutectic mixture of about 60 weight percent camphor and about 40 weight percent naphthalene, since it has a solidification temperature very close to room temperature, i.e., 31-32° C.

The vehicle may consist of the binder alone or, if desired, may also include very small amounts of an organic solvent, such as alcohol, acetone or benzene, to increase its fluidity. In either case, the vehicle is liquefied by being heated to a temperature above its solidification temperature, preferably to from about 10° C. to about 40° C. above the solidification temperature, prior to its being mixed with the spinel nanomixture powder. The powder, likewise, may be preheated to the same temperature prior to being mixed.

Referring now to the flow sheet diagram of FIG. 1, the spinel powder is first mixed with the liquefied vehicle to form a homogeneous pseudoplastic spinel mix comprising, the spinel powder dispersed in the liquefied vehicle, typically in amounts of from about 70 to about 97 weight percent of the spinel powder and from about 30 to about 3 weight percent of the vehicle. The mixing step is generally carried out while simultaneously drip-feeding the vehicle onto the spinel powder. The mixing is done under mechanical agitation until all agglomerates are broken.

The temperature of the spinel mix is then reduced to below the solidification temperature of the vehicle, preferably to below 0° C., to thereby freeze the spinel mix.

Thereafter, the frozen spinel mix is crushed into granulated powdered form, e.g., mortar and pestle, to a size finer than about 30 mesh. The crushed material is classified on a 30 mesh plastic sieve, with the coarser fraction being recrushed until all solids pass through the 30 mesh screen. The powdered frozen spinel mix is a free flowing powder which is held together by the frozen vehicle and which is completely conformable to any given mold cavity under compression given its pseudoplastic shear thinning properties.

The next step in the process is molding the powdered frozen spinel mix into net shape by cold forging. The powdered frozen spinel mix is loaded into a die mold having upper and bottom rams both conformed to the desired three-dimensional shape. The die may be made of graphite, common metallic alloys or steel, preferably graphite. The powder may be protected by using a thin film of polymer plastic liner on both faces of the die. Forging is carried out at or near room temperature at a pressure which will generally range from at least about 1 Ksi up to about 25 Ksi, using a uniaxial Carver type press whose capacity will vary, for example, from 30 to 220 ton, depending upon the size of the body being formed. Particularly for larger bodies, i.e., 6-inch diameter and up, the forging pressure will typically be held within the range of from about 1.5 to about 15 Ksi, preferably from about 2 to about 10 Ksi. Otherwise, the size of the press required becomes very large. Most advantageously, the cold forging step is carried out in two stages of from about 2 to about 5 minutes each stage. The cold forging step produces a green body preform of the desired three-dimensional shape, with green density as high as 38-46% of theoretical density (Th.D.), and net shaped to fit exactly the final graphite dies to be used for densifying the body.

The net-shaped green body preform resulting from the cold forging step is then densified, either by hot pressing or by pressureless sintering, into a sintered spinel body of the desired three-dimensional shape and substantially free of both the vehicle and the LiF sintering aid, both of which sublime out of the green body during the sintering step. When hot pressing is used, the green body loaded in a hot pressing graphite die is transferred to the hot press, for example, a 60 ton Centorr vacuum hot press, and hot pressed. The hot pressing graphite die may be the same graphite die that was employed in the cold forging step or, more suitably, a graphite die lined with upper and lower 3D contoured grafoil. A suitable hot pressing profile comprises LiF liquefaction at 950° C., followed by LiF sublimation at 1300° C. to 1450° C., followed by sintering at 1600° C. to 1800° C. under a ram pressure of from 500 to 5000 psi. A suitable pressureless sintering profile would be similar, differing only in the final sintering stage of the profile, which would be 1650° C. to 1900° C. for 2 to 3 hours, with no applied pressure.

The sintered spinel body is thereafter subjected to further densification via hot isostatic pressing at 1600° C. to 1750° C. at a pressure of 27 to 30 Ksi for 2 to 5 hours, to thereby substantially eliminate any residual porosity in the sintered body and improve its flexural strength.

Figure 2:
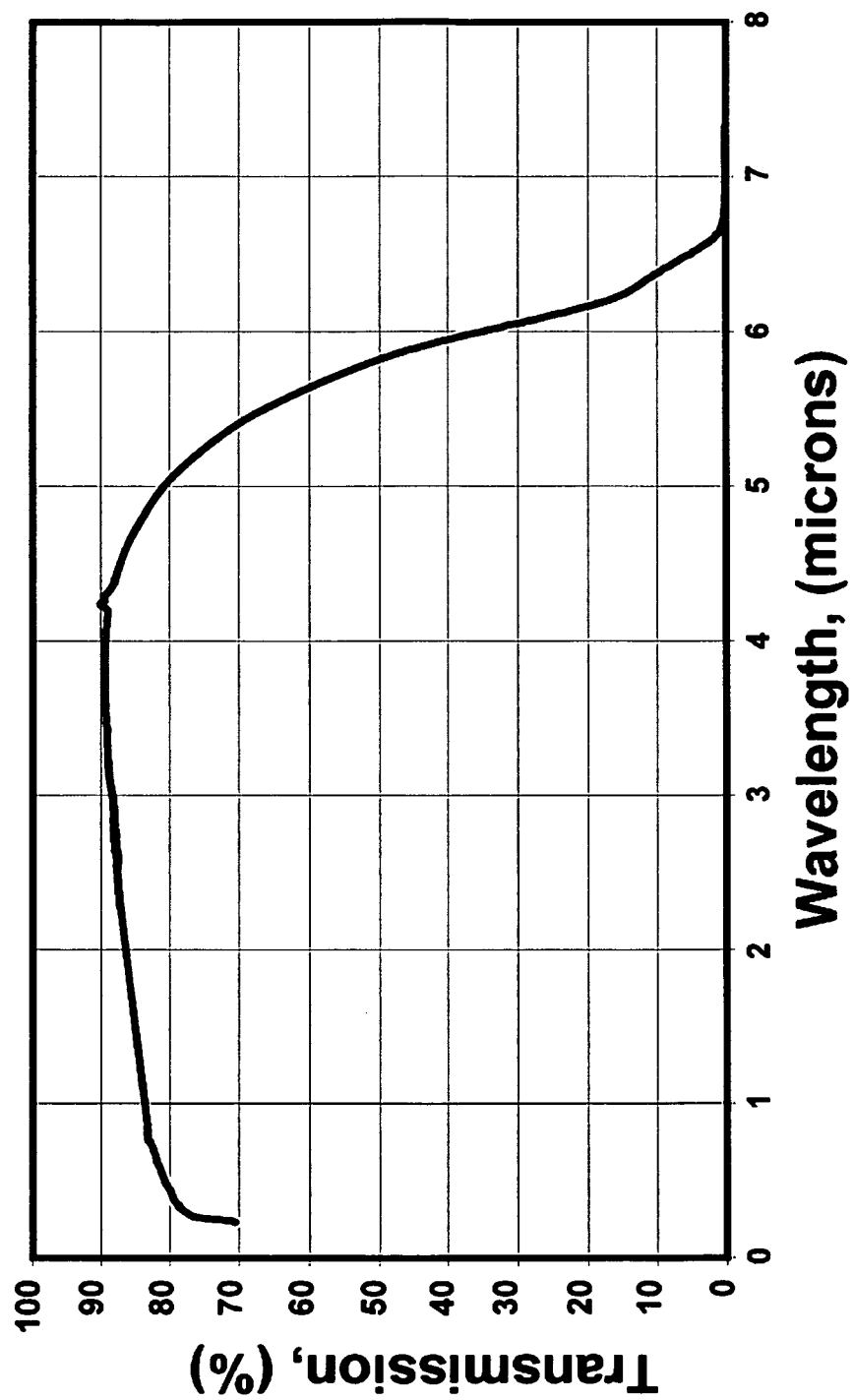
FIG. 2 is a graph showing typical transmission properties of mechanically polished densified spinel domes produced by the freeze-forging method in accordance with the present invention.

By following the freeze-forging procedure described above, spinel domelets with apertures in the range of from 50° to 170°, as well as full hemispherical spinel domes with apertures as large as 180°, have been produced in sizes ranging up to 7 inches in diameter. These transparent sintered spinel domes and domelets, densified to 99.95+% theoretical density, and after being rendered and mechanically polished, were found to be free of any ceramic defects and, as illustrated by the transmission properties graph of FIG. 2, to exhibit transmission properties of at least 83% at 1 μm, 88% at 4 μm, and 65% at 5.5 μm wavelength.

The invention is further illustrated by way of the following examples.

Example 1

The freeze-forging forming and sintering of 1.25" diameter, 0.15" thick, disk blank was produced in this example. 9.47 grams of powder were loaded in the die. Accordingly, 9.0 g of nanomixed spinel powder containing 0.75% LiF was mixed with 0.47 g of camphor/naphthalene sublimable eutectic vehicle (60%/40% camphor/naphthalene). The vehicle was heated up to 70° C. until fluid and homogeneous prior to mixing with the prepared spinel powder. The vehicle was added by slowly adding it onto the solids while dispersing at the same time. The solids were dispersed under mechanical agitation for approximately 10 minutes. Large agglomerates were broken at the end of this period. A homogeneous pseudoplastic, shear thinning powder mix was produced. The powder mix was then frozen by lowering the temperature to −10° C. by placing it into a freezer. The frozen mix was then crushed (mortar and pestle) to a size finer than 30 mesh. The crushed composite material was classified on a 30 mesh plastic sieve. The coarser fraction was re-crushed until all solids passed through the 30 mesh plastic screen.

The deagglomerated −30 mesh composite mix was transferred to a graphite die for cold forging forming with upper and bottom rams conformed to the desired disk sintered blank shape. The powder was protected by using a thin film of polymer plastic liner on both faces. The part was forged at 20 Ksi, two stage pressing, 3 min each stage, using a uniaxial 30 Ton capacity Carver type press. A 1.25" disk blank body with a green density 45% of Th.D. was obtained.

The 1.25" spinel disk green blank preform was left loaded into the same graphite die and transferred to a 60 ton Centorr vacuum hot press. The disk blank was hot pressed at 5000 psi, 1600° C., for 120 minutes, at $5\times10^{-5}$ torr vacuum. A weight reduction of 4.5% was observed. A high quality hot pressed disk blank was obtained exhibiting high transmission, with no discolorations or inclusions. The disk blank was further sintered via hot isostatic pressing (HIP) at 29750 psi, 1700° C. for 2 hours, in Argon, to eliminate any residual porosity.

The final sintered disk was rendered and polished to produce the final intended polished disk 0.15" thick, weighing 8.6 grams. No ceramic defects were obtained. A very high quality polished disk was produced.

Example 2

The freeze-forging forming of 3.5" radius, 66° aperture, 0.15" thick, 4" base diameter spinel domelet blank was pursued in this example. Through computer 3D modeling a 99.95% of Th.D. sintered domelet blank volume was calculated to be 35.2 cc. This corresponded to a total sintered spinel weight of 126 g. Accordingly, 126 g of nanomixed spinel powder containing 0.75% LiF was mixed with 54 g of camphor/naphthalene sublimable eutectic vehicle. The vehicle was heated up to 70° C. until fluid and homogeneous prior to mixing with the prepared spinel powder. The vehicle was added by slowly adding it onto the solids while dispersing at the same time. The solids were dispersed under mechanical agitation for approximately 10 minutes. Large agglomerates were broken at the end of this period. A homogeneous pseudoplastic, shear thinning powder mix was produced. The powder mix was then frozen by lowering the temperature to −10° C. by placing it into a freezer. The frozen mix was then crushed (mortar and pestle) to a size finer than 30 mesh. The crushed composite material was classified on a 30 mesh plastic sieve. The coarser fraction was re-crushed until all solids passed through the 30 mesh plastic screen.

The deagglomerated −30 mesh composite mix was transferred to a graphite die for cold forging forming with upper and bottom rams conformed to the desired sintered domelet blank shape. The powder was protected by using a thin film of polymer plastic liner on both faces. The part was forged at 20 Ksi, two stage pressing, 3 min each stage, using a uniaxial 220 Ton capacity Carver type press. A 4" domelet blank body with a green density 40% of ThD was obtained.

The 4" spinel domelet green blank preform was left loaded into the same graphite die and transferred to a 60 ton Centorr vacuum hot press. The domelet blank was hot pressed at 4000 psi, 1600° C., for 210 minutes, at $5\times10^{-5}$ ton vacuum. A weight reduction of 4.7% was observed. A high quality hot pressed domelet blank was obtained exhibiting high transmission, with no discolorations or inclusions. The domelet blank was further sintered via hot isostatic pressing (HIP) at 29750 psi, 1750° C. for 5 hours, in Argon, to eliminate any residual porosity and to improve its flexural strength to 300 MPa.

The final domelet was rendered and polished at Nu-Tek, Aberdeen, Md., to produce the final intended polished domelet 0.11" thick, weighing 75.6 grams. No ceramic defects were obtained. A very high quality polished domelet was produced.

Example 3

The freeze-forging forming of 4" diameter, 180° aperture hemispherical spinel dome blank was pursued in this example. Through computer 3D modeling a total sintered spinel weight of 457 g. Accordingly, 457 g of nanomixed spinel powder containing 0.75% LiF was mixed with 192 g of camphor/naphthalene sublimable eutectic vehicle. The vehicle was heated up to 70° C. until fluid and homogeneous prior to mixing with the prepared spinel powder. The vehicle was added by slowly adding it onto the solids while dispersing at the same time. The solids were dispersed under mechanical agitation for approximately 10 minutes to obtain a homogeneous shear thinning mix. Large agglomerates were broken at the end of this period. The powder mix was then frozen by lowering the temperature to −10° C. by placing it into a freezer. The frozen mix was then crushed (mortar and pestle) to approximately a size finer than 30 mesh. The crushed composite material was classified on a 30 mesh plastic sieve. The deagglomerated −30 mesh composite mix was transferred to a graphite die for cold forging forming with upper and bottom rams conformed to the desired sintered 4" in diameter hemispherical dome blank. The powder was protected by using a thin film of polymer plastic liner on both faces. The part was forged at 20 Ksi, two stage pressing, 5 min each stage, using a uniaxial 220 Ton capacity Carver type press. A 4", 180° aperture, dome body with a green density 39% of Th.D. was obtained.

The 4" diameter, 180° aperture, hemispherical spinel dome blank green preform was momentarily removed from the green forming die and loaded into the hot pressing graphite die protected by upper and lower 3D contoured grafoil liners. The loaded graphite die was transferred to a 60 ton Centorr vacuum hot press. The domelet was hot pressed at 3200 psi, 1600-1625° C., for 400 minutes, at $5\times10^{-5}$ torr vacuum. A very high quality hot pressed dome blank was obtained exhibiting high transmission, with no discolorations or inclusions. The dome was further sintered via hot isostatic pressing (HIP) at 29750 psi, 1700° C. for 3 hours, in Argon, to eliminate any residual porosity and to improve its flexural strength.

Example 4

The freeze-forging forming of 6" in diameter, 140° aperture spinel domelet blank was pursued in this example. Through computer 3D modeling a total sintered spinel weight of 1530 g. Accordingly, 1530 g of nanomixed spinel powder containing 0.75% LiF was mixed with 640 g of camphor/naphthalene sublimable eutectic vehicle. The vehicle was heated up to 70° C. until fluid and homogeneous prior to mixing with the prepared spinel powder. The vehicle was added by slowly adding it onto the solids while dispersing at the same time. The solids were dispersed under mechanical agitation to obtain a homogeneous mix for approximately 10 minutes. The powder was then prepared following the same procedure used in the previous examples.

The deagglomerated −30 mesh composite mix was transferred to a graphite die for cold forging forming with upper and bottom rams conformed to the desired sintered 6" in diameter hemispherical domelet blank. The powder was protected by using a thin film of polymer plastic liner on both faces. The domelet was forged at 15 Ksi, two stage pressing, 5 min each stage, using a uniaxial 220 Ton capacity Carver type press. A 6", 140° aperture, domelet body with a green density 41% of Th.D. was obtained. The hemispherical spinel domelet blank green preform was momentarily removed from the green forming die and loaded into the hot pressing graphite die protected by upper and lower 3D contoured grafoil liners. The loaded graphite die was transferred to a 60 ton Centorr vacuum hot press. The domelet was hot pressed at 3600 psi, 1600-1625° C., for 660 minutes, at $5\times10^{-5}$ torr vacuum. A very high quality hot pressed domelet blank was obtained exhibiting high transmission, with no discolorations or inclusions. The dome was further sintered via hot isostatic pressing (HIP) at 29750 psi, 1700° C. for 3 hours, in Argon, to eliminate any residual porosity and to improve its flexural strength.

Example 5

The freeze-forging forming of 7" diameter, 0.50" thick at the apex, 180° aperture spinel dome blank was pursued in this example. Through computer 3D modeling a total sintered spinel weight of 2002 g. Accordingly, 2002 g of nanomixed spinel powder containing 0.75% LiF was mixed with 850 g of camphor/naphthalene sublimable eutectic vehicle. The vehicle was heated up to 70° C. until fluid and homogeneous prior to mixing with the prepared spinel powder. The vehicle was added by slowly adding it onto the solids while dispersing at the same time. The solids were dispersed under mechanical agitation to obtain a homogeneous mix for approximately 10 minutes. The powder was then prepared following the same procedure used in the previous examples.

The deagglomerated −30 mesh composite mix was transferred to a graphite die for cold forging forming with upper and bottom rams conformed to the desired sintered 7" in diameter hemispherical dome blank. The powder was protected by using a thin film of polymer plastic liner on both faces. The dome was forged at 10 Ksi, two stage pressing, 5 min each stage, using a uniaxial 220 ton capacity Carver type press. A 7" diameter, 180° aperture, dome body with a green density 39% of Th.D. was obtained. The hemispherical spinel dome blank green preform was removed from the green forming die and loaded into the hot pressing graphite die protected by upper and lower 3D contoured grafoil liners. The loaded graphite die was transferred to a 60 ton Centorr vacuum hot press. The domelet was hot pressed at 3200 psi, 1600-1650° C., for 1290 minutes, at $5\times10^{-5}$ ton vacuum. A very high quality hot pressed dome blank was obtained exhibiting high transmission, with no discolorations or inclusions. The dome was further sintered via hot isostatic pressing (HIP) at 29750 psi, 1700° C. for 3 hours, in Argon, to eliminate any residual porosity and to improve its flexural strength.

Example 6

The freeze-forging forming of 7" diameter, 0.36" thick at the apex, 180° aperture spinel dome blank was pursued in this example. Through computer 3D modeling a total sintered spinel weight of 1400 g was calculated. Accordingly, 1400 g of nanomixed spinel powder containing 0.75% LiF was mixed with 73.7 g of camphor/naphthalene sublimable eutectic vehicle. The vehicle was heated up to 70° C. until fluid and homogeneous prior to mixing with the prepared spinel powder. The vehicle was added by slowly adding it onto the solids while dispersing at the same time. The solids were dispersed under mechanical agitation to obtain a homogeneous mix for approximately 15 minutes. The powder was then prepared following the same procedure used in the previous examples.

The deagglomerated −30 mesh composite mix was transferred to a graphite die for cold forging forming with upper and bottom rams conformed to the desired sintered 7" in diameter hemispherical dome blank. The powder was protected by using a thin film of polymer plastic liner on both faces. The dome was forged at 8 Ksi, two stage pressing, 5 min each stage, using a uniaxial 220 ton capacity Carver type press. A 7" diameter, 180° aperture, dome body with a green density 39% of Th.D. was obtained. The hemispherical spinel dome blank green preform was removed from the green forming die and loaded into the hot pressing graphite die protected by upper and lower 3D contoured grafoil liners. The loaded graphite die was transferred to a 60 ton Centorr vacuum hot press. The dome was hot pressed at 3200 psi, 1630-1680° C., for 30 hours, at $5\times10^{-5}$ torr vacuum. A very high quality hot pressed dome blank was obtained exhibiting high transmission, with no discolorations or inclusions. The dome was further sintered via hot isostatic pressing (HIP) at 29750 psi, 1700° C. for 3 hours, in Argon, to eliminate any residual porosity and to improve its flexural strength.

What is claimed is:

1. A freeze-forging method for producing a net-shape transparent sintered three-dimensional magnesium aluminate spinel body of a desired complex geometry, comprising the steps of:
   (a) providing a ready-to-sinter spinel powder consisting of a nanomixture of magnesium aluminate spinel nanoparticles and a uniformly distributed controlled concentration of nanoparticles of an inorganic sintering aid, wherein said nanomixture has been formed by a process including induced precipitation of said inorganic sintering aid nanoparticles from a dispersion of said spinel nanoparticles in an aqueous solution of said inorganic sintering aid;
   (b) providing a nonaqueous liquefied vehicle comprising a sublimable organic binding agent and having a solidification temperature of from about room temperature to below about 200° C.;
   (c) mixing the spinel powder with the liquefied vehicle to form a homogeneous pseudoplastic spinel mix comprising said spinel powder dispersed in said liquefied vehicle;
   (d) reducing the temperature of said spinel mix to below the solidification temperature of said vehicle to thereby freeze the spinel mix;
   (e) crushing the frozen spinel mix into powdered form;
   (f) molding the powdered frozen spinel mix into a net-shaped green body preform of said desired geometry by cold forging the powdered frozen spinel mix in a mold of said desired geometry, said cold forging being carried out at or near room temperature at a pressure of at least about 1 Ksi;
   (g) densifying said green body preform by hot pressing or pressureless sintering into a sintered spinel body of said desired geometry and substantially free of said vehicle and said sintering aid; and
   (h) subjecting said sintered spinel body to further densification via hot isostatic pressing to thereby substantially eliminate any residual porosity in said sintered body.

2. The method of claim 1, wherein said inorganic sintering aid is LiF, the LiF nanoparticles are 20-100 nm in size, and the spinel nanoparticles are 10-2000 nm in size.

3. The method of claim 1, wherein said inorganic sintering aid is LiF, and said controlled concentration is within the range of from about 0.2 to about 2.0 weight percent.

4. The method of claim 3, wherein said controlled concentration is within the range of from about 0.3 to about 1.25 weight percent.

5. The method of claim 4, wherein said controlled concentration is within the range of from about 0.35 to about 0.75 weight percent.

6. The method of claim 3, wherein the densifying step is carried out by hot pressing of said green body preform, and the hot pressing profile comprises LiF liquefaction at 950° C., followed by LiF sublimation at 1300° C. to 1450° C., followed by sintering at 1600° C. to 1800° C. under a ram pressure of from 500 to 5000 psi.

7. The method of claim 6, wherein the hot isostatic pressing is carried out at 1600° C. to 1750° C. at a pressure of 27 to 30 Ksi for 2 to 5 hours.

8. The method of claim 3, wherein the densifying step is carried out by pressureless sintering of said green body preform, and the pressureless sintering profile comprises LiF liquefaction at 950° C., followed by LiF sublimation at 1300° C. to 1450° C., followed by sintering at 1650° C. to 1900° C. for 2 to 3 hours.

9. The method of claim 8, wherein the hot isostatic pressing is carried out at 1600° C. to 1750° C. at a pressure of 27 to 30 Ksi for 2 to 5 hours.

10. The method of claim 1, wherein the solidification temperature of said vehicle is within the range of from about 30° C. to about 60° C.

11. The method of claim 1, wherein said binding agent is selected from the group consisting of camphor, naphthalene, camphor-naphthalene mixtures and camphene.

12. The method of claim 11, wherein said binding agent is a mixture of from about 55 to about 80 weight percent camphor and from about 45 to about 20 weight percent naphthalene.

13. The method of claim 12, wherein said binding agent is a close to eutectic mixture of about 60 weight percent camphor and about 40 weight percent naphthalene.

14. The method of claim 1, wherein said spinel powder and said vehicle are each preheated to a temperature above the solidification temperature of the vehicle prior to the mixing step.

15. The method of claim 14, wherein the preheating is to a temperature of from about 10° C. to about 40° C. above the solidification temperature of the vehicle.

16. The method of claim 15, wherein the mixing step is carried out while simultaneously drip-feeding said vehicle onto said spinel powder.

17. The method of claim 1, wherein said spinel mix comprises from about 70 to about 97 weight percent of said spinel powder and from about 30 to about 3 weight percent of said vehicle.

18. The method of claim 1, wherein the temperature reducing step to freeze the spinel mix is to a temperature below 0° C.

19. The method of claim 1, wherein the crushing step is carried out until the frozen spinel mix has been reduced to a size finer than about 30 mesh.

20. The method of claim 1, wherein said cold forging is carried out at a pressure of from about 1.5 to about 15 Ksi.

21. The method of claim 20, wherein said cold forging is carried out at a pressure of from about 2 to about 10 Ksi.

22. The method of claim 1, wherein said cold forging is carried out in two stages of from about 2 to about 5 minutes each stage.

23. The method of claim 1, wherein the densifying step is carried out by hot pressing of said green body preform loaded in a graphite die lined with upper and lower 3D contoured grafoil.

24. The method of claim 1, wherein said sintered spinel body is in the shape of a dome with an aperture as large as 180°.

25. The method of claim 24, wherein said aperture is in the range of from 50° to 170°.

* * * * *